June 10, 1952  M. B. RAPPAPORT  2,600,324
FLUID PRESSURE MEASURING APPARATUS
Filed Aug. 25, 1949
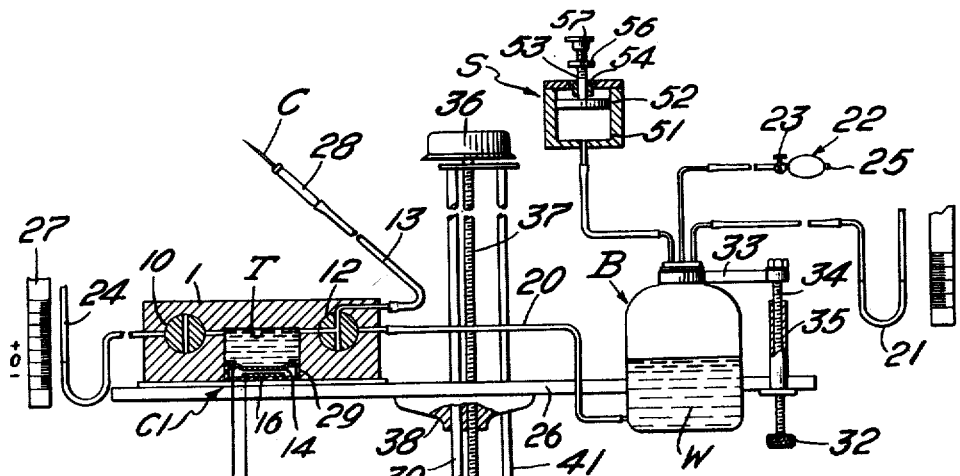
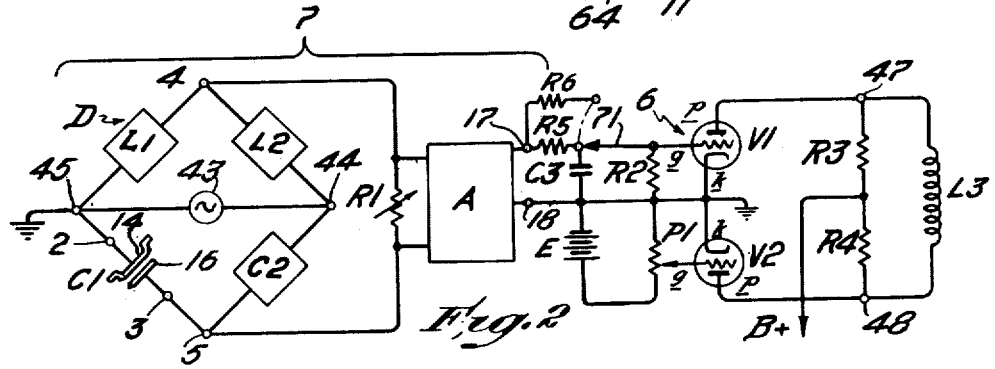
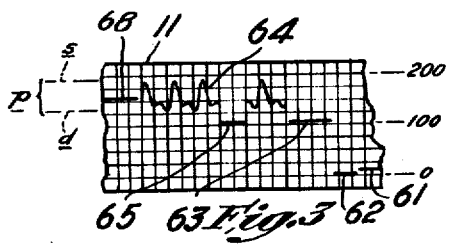
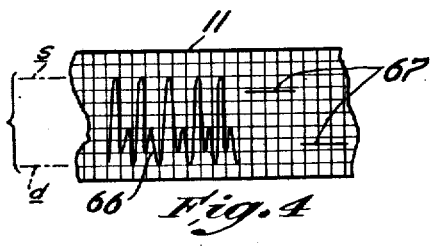
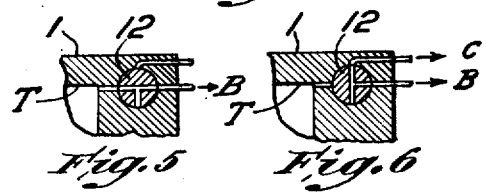
Inventor
Maurice B. Rappaport
by Roberts, Cushman & Grover
Att'ys.

Patented June 10, 1952

2,600,324

UNITED STATES PATENT OFFICE 2,600,324

FLUID PRESSURE MEASURING APPARATUS

Maurice B. Rappaport, Brookline, Mass., assignor to Sanborn Company, Cambridge, Mass., a corporation of Massachusetts Application August 25, 1949, Serial No. 112,320

7 Claims. (Cl. 73—388)

This invention relates to apparatus for sensing and recording fluid pressure variations. Although it is particularly intended for use by the medical profession for measuring and recording physiological pressure variations it is equally well suited for use in measuring other gas and liquid pressures, for example, air pressures occurring in aerodynamic studies. The invention is specially designed to overcome the difficulties of recording fluid pressures in the human body. Liquid pressure such as intravenous, intra-arterial, intracardiac and cerebrospinal and pneumatic pressures such as pneumographic, pneumotachographic and intra-thoracic are among the physiological pressures commonly measured for diagnostic purposes. Liquid pressures may be measured by inserting in the vessel under investigation a hollow needle such as a hypodermic type needle, a catheter, a cannula or similar pressure pickup device interconnected by a liquid-filled, relatively non-distensible tube with a transducer for sensing the pressures transmitted from the needle. Pneumatic pressures are measured by employing a gas filled connection between the transducer and a pickup device such as a pellotte, a pneumographic bellows, a venturi, a pneumotachographic mask, etc. Intra-thoracic pressures are measured by inserting a needle into the thoracic region. The transducer and its associated circuit convert pressure into electrical signals which are amplified by electronic circuits and applied to a recording galvanometer which continuously records the variations in pressures. Customarily the galvanometer traces a graphic record of the pressure variations on a strip of paper longitudinally ruled with lines which indicate the magnitude of the pressure variations. Medical diagnosis may be made by examination of the configuration of the trace and an evaluation of the magnitudes of deflection of the component waves in terms of pressure. In some cases, it may be desirable to express the pulsatile physiologic pressure in terms of average or mean pressure. This is generally done by planimetry and mathematical calculation.

Owing to the problems of maintaining proper conditions throughout the hydraulic system between the human body and the transducer, it has been difficult to produce a record of the physiological pressures which is satisfactorily accurate for medical diagnosis. In addition to the need for keeping the system uncontaminated, it is essential to eliminate air spaces which would dampen the pulsations transmitted to the transducer. Furthermore if no way is provided to check the accuracy with which the pressure variations are detected errors may be introduced by the sensing and amplifying apparatus which seriously affect the diagnostic value of the record. The planimetric and mathematical methods of averaging pressures are time consuming and introduce the danger of human error.

Objects of the present invention are to provide efficient hydraulic apparatus for use with a recording manometer which is easy to maintain in proper operating condition, which may be readily flushed to clean and eliminate the problem of air pockets, and which may be simply calibrated and tested while being operated to insure accurate records of physiological pressures. Another object is to provide a way by which the pressure variations may be integrated or averaged before being applied to the recording apparatus, thereby eliminating the need of calculating an average from the record. Further objects are to provide an apparatus which is economical to manufacture and simple in construction.

In one aspect the apparatus comprises the combination of a fluid-filled chamber which houses a pressure-sensitive element responsive to pressure variations in the chamber, a pressure pickup device at the location of the pressure to be measured, a fluid connection, such as a hollow tube, between the device and the chamber, a reservoir of fluid for filling the chamber and the connection, and a valve having a position in which the reservoir and the chamber and interconnected and another position in which the tube is interconnected with the chamber. Preferably a hand pump or like means is provided for applying pressure to the reservoir so that either the chamber or the connecting tube may be flushed with liquid from the reservoir to remove gas from the tube or chamber, or to flush out a blood clot which may form at the end of the pickup needle.

In another aspect the apparatus includes a chamber containing a pressure-sensitive element actuated by the device, pressure recording or measuring means including a pressure indicator for measuring the pressure sensed by the device, a pressure gauge interconnected with the chamber, and a hand pump or like means for applying pressure to the chamber so that the pressure shown by the pressure indicator may be compared with that shown by the gauge thereby to test the accuracy of the pressure measuring means. Preferably the measuring means is an oscillographic apparatus of the direct writing or photographic variety, although a direct reading galvanometer may be used in appropriate applications.

In still another aspect the apparatus includes an electronic circuit for amplifying and rectifying the electrical pressure signal of the pressure sensitive element, and an averaging or integrating circuit including a resistor-capacitor network may be selectively connected between the aforesaid electronic circuit and the pressure indicator, whereby the variations of the pressure signal are averaged and a steady direct current voltage is applied to the pressure indicator so that it indicates the average of the pressure variations transmitted to the pressure sensitive element.

In a further aspect the apparatus includes means for adjusting the elevation of the pressure-sensitive element contained in the chamber relative to the location in the human body of the device placed therein for the purpose of transmitting pulsations to the pressure-sensitive element, so that errors in the response of the element due to hydrostatic pressure in the connection between the pickup device and the pressure-sensitive element may be corrected. Preferably additional means are provided for adjusting the elevation of the reservoir relative to the pressure element so that the hydrostatic head between the surface of the liquid in the reservoir and the element may also be eliminated.

In a still further aspect means is provided for applying to the chamber a predetermined pressure of known value so that the response of the pressure-sensitive element and the recording apparatus actuated by the element may be tested.

For the purpose of illustration a typical embodiment of the invention is illustrated in the accompanying drawing in which:

Fig. 1 is a diagrammatic view of pressure sensing and recording apparatus;

Fig. 2 is a schematic diagram of an electronic circuit for amplifying pressure signals;

Figs. 3 and 4 are fragmentary views of recording paper shown in the apparatus in Fig. 1; and Figs. 5 and 6 are fragmentary views of a valve shown in Fig. 1.

The pressure sensing and recording apparatus shown in Fig. 1 includes a hollow needle C which is to be inserted in a vessel of the human body, a housing 1 having a transducer chamber T in which is contained a condenser microphone C1, an electronic circuit 7 including a bridge network D (Fig. 2) and an associated amplifier A, an amplifying circuit 6, and a recorder R which includes a galvanometer coil L3, a stylus 9 and a moving strip of recording paper 11. A bottle B containing a saline solution W and, if desired, an anti-coagulant such as heparin, may be interconnected with the transducer chamber by valve 12 and tube 20. Connected to the bottle B are a mercury manometer 21, a hand pump 22 and a pressure generating device S. A water manometer 24 may be interconnected with the transducer chamber T through valve 10.

Physiological pressures are transmitted from the body through the saline solution which fills needle C, a glass adapter 28 joining the catheter and a tube 13, the tube 13, valve 12 and the transducer chamber T. The preferred type of transducer is a condenser microphone although various pressure-sensitive devices are suitable for use with the present invention. Condenser microphone C1 includes a mounting 29 of insulating material to which are attached a metal diaphragm 14 and a fixed metal plate 16. The diaphragm while insulated from the fixed plate is isoelectric with housing 1 and is grounded at terminal 45 so that the subject of examination is at ground potential. Pressure variations in the chamber T cause diaphragm 14 to move relative to the fixed plate 16 thus varying the capacitance of the microphone and the potential of the fixed plate with respect to ground. This capacitative change causes the bridge D and its associated amplifier 7 to produce an electric signal at the output terminals 17 and 18. The signal is amplified by electronic circuit 6 and applied at a suitable potential to galvanometer coil 8 which deflects the stylus 9.

As shown in Fig. 2 the condenser microphone C1 is connected at terminals 2 and 3 in one arm of a bridge network D. The other arms of the bridge include inductances L1 and L2 and capacitance C2. The circuit including L2 and C2 and the circuit including condenser microphone C1 and inductance L1 are each tuned to resonance with a generator of oscillating current 43 which has a frequency preferably of about 250 kilocycles. The oscillating current is applied to bridge input terminals 44 and 45. Normally, the reactances of L1, C1, L2 and C2 are equal and the bridge is in a balanced condition with no voltage existing between its output terminals 4 and 5. However, when a pressure variation is transmitted to the transducer chamber T a corresponding variation in the capacitance of condenser microphone C1 results. The capacitance variation in turn will cause a phase difference between the voltages in circuit L1—C1 and circuit L2—C2, thereby producing at the terminals 4 and 5 an alternating voltage signal whose amplitude is dependent on the phase difference between the voltages in the resonant circuits. A variable resistance R1, shown as a control knob in Fig. 1, may be adjusted to control the amplitude of the signal appearing at terminals 4 and 5. This signal is applied to a conventional amplifying and rectifying circuit A which produces an amplified direct current voltage signal at terminals 17 and 18.

Various details of the pressure sensing bridge network are shown in the copending application of Arthur Miller, Serial No. 112,321, filed this date, now Patent No. 2,558,190.

The voltage at terminal 17 and 18 is a direct current voltage whose magnitude represents the pressure acting on the diaphragm. The power available at these terminals is usually insufficient to operate recording or rugged indicating instruments. It is convenient to include a direct current amplifier between terminals 17 and 18 and the final recording or indicating instrument. Such an amplifier is shown in simplified form at 6 in Fig. 2. The voltage at terminal 17 is applied to the amplifier 6 by means of a trace selecting switch 71 through either a coupling resistor R6 or an integrating network R5 and C3, to be described hereinafter.

In the illustrated amplifier 6, the tubes V1 and V2 and the resistors R3 and R4 may be considered as a bridge with the galvanometer L3 connected across the corners thereof between terminals 47 and 48. Assuming that the tubes are similar, their operating voltages equal, and the resistors R3 and R4 equal, there will be no potential difference across the ends of the galvanometer, and it will be in its neutral position. If, however, the operating voltages are not equal, the balance will be destroyed and the galvanometer will be deflected from its neutral position. In Fig. 2 a potentiometer P1, and biasing voltage E are shown as an adjustable source of voltage for the grid $g$ of amplifier V2. The grid $g$ of V1 has its potential determined by the rectified bridge signal appearing at terminals 17 and 18. When the bridge output is zero, the potentiometer P1 is used to set the galvanometer at any desired position on the chart. This position is the reference level from which the galvanometer is deflected by the bridge output.

Coil L3 through a conventional electromechanical connection indicated by broken line 31 causes the stylus 9 to deflect transversely of the strip of recording paper 11. The strip is moved under the stylus so that it traces a visible record 64 on the paper (Fig. 3). Preferably the stylus 9 is heated, the paper 11 being sensitized so that it responds to heat where touched by the stylus to render visible the record traced thereon. However, by using a weighted stylus and pressure sensitive paper or one of the electro-chemical writing methods a satisfactory trace may be produced.

The aforesaid trace-selecting switch 71 has two positions, a normal trace position (not shown) and an average trace position (Fig. 2). In the normal trace position the voltage at terminal 17 is applied substantially unchanged through the coupling resistor R6 to the amplifier 6 to produce a fluctuating trace 64 (Fig. 3). In the average trace position the grid $g$ of tube VI is connected to the resistor-capacitor network R5—C3. Suitable values for these components are one megohm and one microfarad respectively. This network functions as an integrating or averaging circuit for converting the fluctuating direct current signal at terminal 17 to an unvarying direct current signal at the grid of amplifier VI, the amplitude of the unvarying signal being proportional to the average value of the fluctuating signal at terminal 17. The recorder will then produce a flat trace 68 on recording paper 11, the flat trace 68 indicating the average pressure then being sensed.

According to this invention the integrating circuit obviates the need for length measurements of the fluctuating trace 64 and calculation of its average value. The diagnostician may read the average pressure directly from the average trace 68.

Referring again to Fig. 1 it can be seen that the transducer housing 1 and the bottle B are supported on a platform 26 which in turn is mounted on a vertically adjustable bracket 38. The bracket 38 is supported by the threaded shaft 37 and the vertical guide shafts 39 and 41. The knob 36 fixed to the top of the shaft 37 may be rotated to turn the shaft 37 thus elevating or lowering platform 26. The bottle B is supported by a yoke 33 and a shaft 34 threaded in collar 35 and may be moved vertically relative to the transducer CI by turning thumb screw 32.

Valves 10 and 12 allow various connections to be made respectively between the transducer chamber T and the water manometer 24 and between the bottle B, the needle C, and the transducer chamber T. Valve 10 is a two-position valve having an open position in which the transducer chamber T and the water manometer 24 are interconnected, and a closed position in which this connection is blocked. Valve 12 has three positions shown in Figs. 1, 5 and 6. In the position shown in Fig. 1 the needle C is interconnected with the transducer chamber T; in the position shown in Fig. 5 the bottle B is interconnected with the transducer chamber; and in the position shown in Fig. 6 the bottle B is interconnected with the catheter C.

Pressure may be applied in bottle B by means of the hand pump 22 or the device S. The hand pump 22 is a conventional rubber bulb type pump having a check valve 25. An escape valve 23 is provided to release pressures generated by the hand pump. The device S comprises a cylinder 51 in which slides a piston 52. The piston is attached to a threaded rod 53 fitted slidingly in collar 54. A nut 56 on the threaded portion of the shaft 53 may be adjusted relative to the piston 52 so as to limit downward movement of the piston when force is applied on the head 57 at the upper end of the piston thus determining the amount of pressure produced by movement of the piston.

According to the present invention it is possible to prepare the sensing and recording apparatus for measurement of physiological pressure variations as follows. With valve 12 interconnecting bottle B and the transducer chamber T (Fig. 5) and valve 10 open, pressure is applied to bottle B by means of the hand pump 22 causing a flow of the saline solution W through the tube 20 filling the transducer chamber T completely with liquid and thence through the valve 10 to the water manometer 24, causing the solution to overflow the manometer. If necessary the bottle B is then lowered relative to the transducer chamber T by turning thumb screw 32 and the pressure in the bottle released by opening valve 23 so that water will flow back into the bottle. Valve 23 is then closed and pressure again applied to force saline solution into the transducer chamber and the water manometer, the cycle being repeated two or three times to insure thorough flushing and elimination of the air pockets from the chamber. Absence of air pockets is indicated when bubbles cease flowing through the water manometer. Valve 12 is then turned to the position shown in Fig. 6 and saline solution is forced through the lead tube 13, the glass adapter 28 and the catheter C to free them of air pockets. If there are bubbles in the liquid flowing to the needle they may be detected by viewing the glass adapter. The glass adapter comprises a section of transparent glass tubing, provided at its ends with coupling positions for connection with the needle and the lead tube respectively. Valve 12 is then returned to the position in which it inter-connects the bottle B and the transducer T and the elevation of the bottle relative to the transducer chamber T is adjusted by turning thumb screw 32 until the surface of the saline solution W in the bottle is level with plate 14 of condenser microphone CI. Scale 27 associated with water manometer 24 is graduated with its zero mark at the same level as diaphragm 14, so that when the height of the bottle is properly adjusted the solution in the manometer 24 will rise to this zero mark indicating that the surface of saline solution in the bottle is level with the diaphragm, and that there is no hydrostatic head between the bottle and the transducer.

The accuracy with which the transducer CI and the electronic amplifying and recording apparatus responds to pressures in the transducer chamber T may be tested as follows. The recording paper 11 is moved under stylus 9 allowing the stylus to mark a trace 61 (Fig. 3). If valve 10 is closed and valve 12 inter-connects the bottle and the transducer chamber and if, in addition, there is no pressure in the bottle B; there will be no pressure on the transducer CI. Under these hydraulic conditions the trace 61 on the recording paper should be at the line marked zero. However, if the trace is not at zero, the zero set control P1 (Figs. 1 and 2) is adjusted until the mark 62 is traced at the selected zero line. With valve 23 closed pressure is now applied to bottle B by means of the hand pump 22 and maintained while the stylus marks another trace 63. This pressure will also be indicated by the mercury manometer 21, and if the trace 63 is not on the corresponding line marked on the recording paper (Fig. 3) the error is corrected by means of sensitivity control R1 (Figs. 1 and 2). If a test record of a low pressure is desired, valve 10 is opened inter-connecting the water manometer 24 with the chamber T. Pressures in the order of a few millimeters of water may then be applied to the transducer C1 by elevating the bottle B until the desired pressure is indicated by the water manometer. The bottle is lowered until the manometer reads zero pressure and valve 10 is closed before physiological measurements are made.

When sensing and recording apparatus has been properly calibrated as described above the needle C is inserted in the vessel of the human body wherein pressures are to be measured. By rotating the knob 36 the platform 26 is then raised or lowered until the zero mark of scale 27, and hence the diaphragm 14, is on a level with the tip of the needle. Valve 12 is then turned to the position shown in Fig. 1 in which the needle is inter-connected with the transducer chamber T and the apparatus is ready to record the physiological pressure variations at the location of the needle.

As physiological pulsations are sensed stylus 9 will trace a record 64 (Fig. 3) of these pulsations on the moving strip 11 of recording paper. Trace 64 represents a typical record of arterial pulsations which vary between a maximum pressure of above zero known as the systolic pressure and indicated by the broken line $s$ in Fig. 3, and a minimum pressure known as the diastolic pressure indicated by broken line $d$. The range of pressures between the systolic and diastolic is known as the pulse pressure, indicated by the bracket at $p$.

It is advisable at the beginning of a liquid pressure test to examine again the glass adapter 28 for indications of air pockets. Should such pockets exist in the liquid connection between the needle and the condenser microphone the solution in the connection will flow back and forth slightly and the physiologic pulsations will be dampened thereby. Usually there is present in the adapter some foreign matter, such as blood particles, which will move appreciably with the solution thus indicating the presence of air bubbles. The air bubbles should be removed by the flushing procedure previously described.

As the test proceeds it may be desirable to check occasionally to see that the stylus is recording pressure variations accurately in relation to the calibration lines on the recording paper 11. To this end the device S may be prepared for producing a standard pressure as follows: Force is applied manually to the head 57 urging the piston 52 downward in the cylinder 51 thus creating pressure in the cylinder. This pressure will be applied through the bottle B to the mercury manometer 21. The nut 56 is adjusted to limit the stroke of the piston, thereby to produce a predetermined pressure change in the pressure bottle, this being a convenient way of calibrating at any desired time during the test. The valve 12 may be rotated to the position shown in Fig. 5 in which the bottle and the transducer chamber are inter-connected and the head 57 depressed applying the predetermined pressure to the transducer chamber, this being a convenient way of calibrating the instrument at any time during the course of the test.

As the measurement continues further it may be desirable to record the trace of pulsations 64 on greater scale. With the apparatus described it is possible to record an enlarged trace 66 (Fig. 4). The sensitivity control R1 (Figs. 1 and 2) is adjusted to increase the amplitude of the electrical signal through coil L3, and hence the amount of deflection of stylus 9 for a given pressure change, so that the pulse pressure $p$ will be recorded over a wider portion of the recording paper 11. When this is done the systolic portion of the pressure gram may rise above the upper limit of the paper. It may, therefore, be necessary to adjust the zero set control P1 so that in effect the zero level is below the limit of the strip 11, and the stylus indicates pressures only in the limited range of the pulse. To determine the pressure range of the amplified pulsations it is desirable to mark two traces of known pressures on the paper within the range of the pulse pressures. These traces 67 may be produced by applying calibrated pressures to the bottle B by means of the hand pump 22 or the standard pressure device S as described above.

The hydraulic system embodying the present invention not only affords thorough flushing of pressure transmitting passages preparatory to recording physiological pressures but also permits the operator to make the accuracy tests and sensitivity adjustments rapidly and efficiently, increasing the comfort of the patient under examination, and insuring an accurate record of the pressure measurements.

By using a stiff diaphragm which has a very limited movement in response to pressure changes there is little back-and-forth flow in the restricted passageways such as needles and catheters. Thus, in testing rapidly fluctuating pressure in a liquid, a minimal amount of attenuation is produced upon higher frequency components of the pressure waves.

The same efficiency and accuracy may be obtained in making gas pressure measurements. The liquid is completely eliminated from the system. The gaseous pressures under investigation are then allowed to communicate with the transducer by way of tubing 13 and valve 12, the latter being in calibrating position. Calibration may be accomplished by means of valve 12 and bottle B and its associated parts. If the gas under investigation should not be mixed with air the valve 23 is closed and the bulb 22 is not used. Pressure change is produced by valve S.

It should be understood that the present disclosure is for the purpose of illustration only and that this invention includes all modifications and equivalents which fall within the scope of the appended claims.

I claim:

1. Pressure sensing apparatus comprising a chamber containing an element responsive to pressure variations, an indicator responsive to said element, a liquid reservoir which contains a body of liquid having a free horizontal surface with a space thereabove, means for applying pneumatic pressure on said surface, means for connecting said space either to said means or to the atmosphere, a supply conduit leading from the reservoir to the chamber for supplying liquid to the chamber, a test conduit for connection between said chamber and the source of pressure to be sensed, and valve means for connecting said chamber to said reservoir for flushing or calibrating said indicator and to said source for testing.

2. Pressure sensing apparatus comprising a chamber containing an element responsive to pressure variations, an indicator responsive to said element, a liquid reservoir which contains a body of liquid having a free horizontal surface with a space thereabove, means for applying pneumatic pressure on said surface, means for connecting said space either to said means or to the atmosphere, a supply conduit leading from the reservoir to the chamber for supplying liquid to the chamber, a test conduit for connection between said chamber and the source of pressure to be sensed, valve means for connecting said chamber to said reservoir for flushing or calibrating said indicator and to said source for testing, and vertical adjustment means for adjusting said element and surface to the same level.

3. Pressure sensing apparatus comprising a chamber containing an element responsive to pressure variations, an indicator responsive to said element, a liquid reservoir which contains a body of liquid having a free horizontal surface with a space thereabove, means for applying pneumatic pressure on said surface, means for connecting said space either to said means or to the atmosphere, a supply conduit leading from the reservoir to the chamber for supplying liquid to the chamber, a test conduit for connection between said chamber and the source of pressure to be sensed, valve means for connecting said chamber to said reservoir for flushing or calibrating said indicator and to said source for testing, vertical adjustment means for adjusting said element and surface to the same level, a standard manometer connected to said chamber for calibrating said indicator, and a manometer connected to said reservoir for measuring variations of pressure in the reservoir.

4. Pressure sensing apparatus comprising a chamber containing an element responsive to pressure variations, an indicator responsive to said element, a liquid reservoir which contains a body of liquid having a free horizontal surface with a space thereabove, means for applying pneumatic pressure on said surface, a supply conduit leading from the reservoir to the chamber for supplying liquid to the chamber, a test conduit for connection between said chamber and the source of pressure to be sensed, valve means for connecting said chamber to said reservoir for flushing or calibrating said indicator and to said source for testing, vertical adjustment means for adjusting said element and surface to the same level, and additional adjustment means for adjusting said element and surface to the level of said source.

5. Pressure sensing apparatus comprising a chamber containing an element responsive to pressure variations, an indicator responsive to said element, a liquid reservoir which contains a body of liquid having a free horizontal surface with a space thereabove, means for applying pneumatic pressure on said surface, means for connecting said space either to said means or to the atmosphere, a supply conduit leading from the reservoir to the chamber for supplying liquid to the chamber, a test conduit for connection between said chamber and the source of pressure to be sensed, valve means for connecting said chamber to said reservoir for flushing or calibrating said indicator and to said source for testing, adjustment means for adjusting said element and surface to the level of said source, a standard manometer connected to said chamber for calibrating said indicator, and a manometer connected to said reservoir for measuring variations of pressure in the reservoir.

6. Pressure sensing apparatus comprising a chamber containing an element responsive to pressure variations, an indicator responsive to said element, a liquid reservoir which contains a body of liquid having a free horizontal surface with a space thereabove, means for applying pneumatic pressure on said surface, means for connecting said space either to said means or to the atmosphere, a supply conduit leading from the reservoir to the chamber for supplying liquid to the chamber, a test conduit for connection between said chamber and the source of pressure to be sensed, valve means for connecting said chamber to said reservoir for flushing or calibrating said indicator and to said source for testing, vertical adjustment means for adjusting said element and surface to the same level, additional adjustment means for adjusting said element and surface to the level of said source, a mercury manometer connected to said reservoir for measuring variations of pressure in the reservoir, a water manometer connected to said chamber for measuring variations of pressure in the chamber, and a valve for disconnecting the water manometer from the chamber while sensing pressure at said source.

7. Pressure sensing apparatus comprising a chamber containing an element responsive to pressure variations, an indicator responsive to said element, a liquid reservoir which contains a body of liquid having a free horizontal surface with a space thereabove, means for applying pneumatic pressure on said surface, means for connecting said space either to said means or to the atmosphere, a supply conduit leading from the reservoir to the chamber for supplying liquid to the chamber, a test conduit for connection between said chamber and the source of pressure to be sensed, valve means for connecting said chamber to said reservoir for flushing or calibrating said indicator and to said source for testing, vertical adjustment means for adjusting said element and surface to the same level, additional adjustment means for adjusting said element and surface to the level of said source, a mercury manometer connected to said reservoir for measuring variations of pressure in the reservoir, a water manometer connected to said chamber for measuring variations of pressure in the chamber and a valve for disconnecting the water manometer from the chamber while sensing pressure at said source, and said means for applying pneumatic pressure comprising a piston and cylinder and means for adjusting the stroke of the piston to produce a predetermined change in pressure.

MAURICE B. RAPPAPORT.

REFERENCES CITED

The following references are of record in the file of this patent:

UNITED STATES PATENTS

| Number | Name | Date |
| --- | --- | --- |
| 2,118,329 | Snyder | May 24, 1938 |
| 2,297,905 | Luisada | Oct. 6, 1942 |
| 2,300,327 | White | Oct. 27, 1942 |
| 2,368,278 | Warshaw | Jan. 30, 1945 |
| 2,382,547 | De Juhasz | Aug. 14, 1945 |
| 2,439,047 | Grinstead et al. | Apr. 6, 1948 |

OTHER REFERENCES

Null Point Manometer in "Proceedings of the Society for Experimental Biology and Medicine," vol. 56, No. 1, page 53, May 1944.